(12) United States Patent
McCurter

(10) Patent No.: US 11,186,129 B1
(45) Date of Patent: Nov. 30, 2021

(54) TOWING COUPLER

(71) Applicant: Premier Equipment, Inc., Tualatin, OR (US)

(72) Inventor: Zachery D. McCurter, Portland, OR (US)

(73) Assignee: Premier Equipment, Inc., Tualatin, OR (US)

( * ) Notice: Subject to any disclaimer, the term of this patent is extended or adjusted under 35 U.S.C. 154(b) by 244 days.

(21) Appl. No.: 16/398,849

(22) Filed: Apr. 30, 2019

Related U.S. Application Data

(60) Provisional application No. 62/670,189, filed on May 11, 2018.

(51) Int. Cl.
*B60D 1/04* (2006.01)

(52) U.S. Cl.
CPC ........................................ *B60D 1/04* (2013.01)

(58) Field of Classification Search
CPC .......... B60D 1/04; A01B 59/042; F16B 45/02
See application file for complete search history.

(56) References Cited

U.S. PATENT DOCUMENTS

| | | | | |
|---|---|---|---|---|
| 2,426,532 A | * | 8/1947 | Tierney | B60D 1/04 280/504 |
| 2,766,995 A | * | 10/1956 | Weiss | B60D 1/04 280/504 |
| 2,842,380 A | * | 7/1958 | Weiss | B60D 1/04 280/504 |
| 3,475,037 A | * | 10/1969 | Weiss | B60D 1/04 280/504 |
| 4,014,562 A | * | 3/1977 | Kunze | B60D 1/04 280/508 |
| 4,071,263 A | * | 1/1978 | Kunze | A01B 59/006 280/508 |
| 4,108,464 A | * | 8/1978 | von Allworden | A01B 59/006 280/508 |
| 4,157,838 A | * | 6/1979 | von Allworden | A01B 59/006 280/508 |
| 4,434,996 A | * | 3/1984 | Wallace | B60D 1/07 280/504 |

(Continued)

OTHER PUBLICATIONS

Premier Manufacturing Co., Couplings/Pintle Hitches, https://www.premier-mfg.com/products/coupling, 10 pages (printed Oct. 3, 2019).

(Continued)

*Primary Examiner* — Minnah L Seoh
*Assistant Examiner* — Michael R Stabley
(74) *Attorney, Agent, or Firm* — Klarquist Sparkman, LLP

(57) ABSTRACT

A towing coupler for truck or other vehicle includes a body and a hook. A first latch is coupled to the body for pivoting about a first pivot axis between an open and closed position. In the open position, a draw bar or other towing element of a towed vehicle can be placed on or removed from the hook while in the closed position the first latch retains the draw bar on the hook. A second latch is coupled to the body for pivoting about a second pivot axis between first and second positions. The first latch is biased to pivot toward the open position and the second latch is biased to pivot in the opposite direction from the first latch. The first and second latches have surfaces configured for coupling together to retain the first latch in the position to which it is moved.

18 Claims, 12 Drawing Sheets

(56) References Cited

U.S. PATENT DOCUMENTS

| | | | | |
|---|---|---|---|---|
| 4,492,386 | A * | 1/1985 | Roberts | B60D 1/04 24/600.1 |
| 4,721,324 | A * | 1/1988 | Blacklaw | B60D 1/04 280/504 |
| 4,758,015 | A * | 7/1988 | Pixley | B60D 1/04 280/504 |
| 4,958,848 | A * | 9/1990 | Nash | B60D 1/04 280/504 |
| 5,332,250 | A * | 7/1994 | Thorwall | B60D 1/28 280/507 |
| 5,441,117 | A * | 8/1995 | Fartmann | A01B 59/006 172/272 |
| 5,497,835 | A * | 3/1996 | Laubner | B60D 1/04 172/272 |
| 7,225,883 | B2 * | 6/2007 | Yamada | A01B 59/006 172/272 |
| 7,431,321 | B2 * | 10/2008 | Terpsma | B60D 1/04 138/145 |
| 8,684,391 | B2 * | 4/2014 | Szczepanek | B60D 1/04 280/504 |
| 9,108,478 | B2 | 8/2015 | Grycko et al. | |
| 2005/0115723 | A1 * | 6/2005 | Ollefs | B60D 1/04 172/439 |
| 2012/0298387 | A1 * | 11/2012 | Sauermann | B60D 1/141 172/272 |
| 2016/0075197 | A1 | 3/2016 | Coleman et al. | |

OTHER PUBLICATIONS

Premier Manufacturing Co., 2880 Slack Reducing Coupling, https://www.premier-mfg.com/products/couplings/2880-slack-reducing-coupling, 10 pages (revised Mar. 2015).

Premier Manufacturing Co., 270 Coupling, https://www.premier-mfg.com/images/uploads/product_pdfs/270_Coupling_Installation_Guide.pdf, 10 pages (revised Oct. 2009).

* cited by examiner

TOWING COUPLER

CROSS REFERENCE TO RELATED APPLICATION

This application claims the benefit of U.S. Provisional Application Ser. No. 62/670,189, entitled TOWING COUPLER, filed on May 11, 2018, which is incorporated by reference herein.

TECHNICAL FIELD

This disclosure relates to towing couplers and more specifically to towing couplers for land vehicle trailers.

SUMMARY

In accordance with an embodiment, a towing coupler for a truck or other vehicle includes a body and a hook portion. A first latch is coupled to the body for pivoting about a first pivot axis between a first latch open position and a first latch closed position. In the first latch open position, a draw bar or other towing element of a towed vehicle can be placed on or removed from the hook portion. In the first latch closed position, the first latch retains the draw bar on the hook portion. A second latch is coupled to the body for pivoting about a second pivot axis between first and second positions. The first latch is biased to pivot toward the open position and the second latch is biased to pivot in the opposite direction from the first latch. The first and second latches have surfaces configured for coupling together to retain the first latch in the position to which it is moved.

In accordance with an aspect of this disclosure, a towing coupler for a vehicle can comprise: a body comprising a hook portion having an upwardly facing hook opening and a latch supporting portion, such as a column, projecting upwardly from the hook portion; a first latch pivoted to the latch supporting portion and pivotal about a first latch pivot axis between first latch open and first latch closed positions, the first latch comprising upwardly facing first and second latch engaging surfaces, the first latch engaging surface being spaced further from the first latch pivot axis than the second latch engaging surface; a first spring coupled to the body and to the first latch and biasing the first latch to pivot about the first latch pivot axis in a first direction and away from the first latch closed position; a second latch pivoted to the latch supporting portion and pivotal about a second latch pivot axis, the second latch being pivotal about the second latch pivot axis between a second latch first position and a second latch second position, wherein in the second latch first position and with the first latch in the first latch open position, the second latch is coupled at least partially to the first latch engaging surface, and wherein in the second latch second position and with the first latch in the first latch closed position, the second latch is coupled at least partially to the second latch engaging surface; and a second spring coupled to the body and to the second latch and biasing the second latch to pivot about the second latch pivot axis in a second direction opposite to the first direction, the second spring pivoting the second latch to the second latch second position upon pivoting of the first latch from the first latch open position toward the first latch closed position.

As an aspect of an embodiment, the first latch engaging surface can comprise a first latch engaging surface portion facing away from the hook portion. In addition, the second latch engaging surface can comprise a concave second latch engaging surface portion facing away from the hook portion.

As another aspect, the radius of curvature of the concave second latch engaging surface portion can be smaller than the radius of curvature of the concave first latch engaging surface portion.

As yet another aspect, the second latch can comprise downwardly facing third and fourth latch engaging surfaces, wherein the third and fourth latch engaging surfaces can be positioned to at least partially engage the first latch engaging surface when the first latch is in the first latch open position and the second latch is in the second latch first position, and wherein the fourth latch engaging surface can be positioned to at least partially engage the second latch engaging surface when the first latch is in the first latch closed position and the second latch is in the second latch second position.

As a further aspect, the first latch engaging surface can comprise first and second first latching surface portions with a land positioned at least partially between the first and second first latching surface portions. The land can be sized and positioned to engage the latch supporting portion when the first latch is in the first latch open position.

As another aspect, the second latch engaging surface can comprise first and second spaced apart second latching surface portions. In addition, a portion of the latch supporting portion can be positioned between the first and second spaced apart latching surface portions.

As a still further aspect, each of the first and second first latching surface portions can comprise concave surfaces and each of the first and second spaced apart second latching surface portions can also comprise concave surfaces.

As yet another aspect, the radius of curvature of each of the first and second spaced apart second latching surface portions can be smaller than the radius of curvature of each of the first and second first latching surface portions.

As a further aspect, the second latch can comprise third and fourth latch engaging portions, the third latch engaging portion comprising first and second spaced apart third latching surface portions and the fourth latch engaging portion comprising first and second spaced apart fourth latching surface portions. In addition, the land can be positioned between the first and second spaced apart fourth latching surface portions at least when the first latch is in the first latch open position.

As another aspect, each of the first and second first latching surface portions and first and second spaced apart second latching surface portions can be concave. Also, the first and second spaced apart third latching surface portions and the first and second spaced apart fourth latching surface portions can be convex.

As a further aspect, the second latch pivot axis can be parallel to the first latch pivot axis and the second latch pivot axis can be positioned higher on the latch supporting portion or column than the first latch pivot axis In accordance with another aspect, a towing coupler for a vehicle can comprise: a body comprising a hook having a first leg portion, a base portion and a second leg portion spaced from the first leg portion so as to define a tow draw bar receiving space above the base portion and between the first and second leg portions, the hook having an upwardly facing hook opening communicating with the tow draw bar receiving space, the body also comprising a latch supporting column portion projecting upwardly from the second leg portion; a first latch comprising a first latch proximal end portion and a first latch distal end portion, the first latch proximal end portion being pivoted to the column portion and pivotal about a first latch pivot axis, the first latch being pivotal between a first latch closed position and a first latch open position, wherein in the first latch closed position the first latch overlies the hook opening and the first latch distal end portion engages the first leg portion of the hook and closes the hook opening, and wherein in the first latch open position the first latch distal end portion is pivoted away from the first leg portion of the hook to open the hook opening to provide access to the tow draw bar receiving space; the first latch comprising upwardly facing first and second latch engaging surfaces, the first latch engaging surface being spaced nearer to the first latch distal end portion than the second latch engaging surface, and wherein a ridge is provided between the first and second latch engaging surfaces with the first and second latch engaging surfaces having respective surface portions that slope downwardly from the ridge; a first spring coupled to the body and to the proximal end portion of the first latch and biasing the first latch to pivot about the first latch pivot axis in a first direction and away from the first latch closed position and toward the first latch open position; a second latch pivoted to the column portion and pivotal about a second latch pivot axis, the second latch being pivotal about the second latch pivot axis between a second latch first position and a second latch second position; the second latch comprising third and fourth latch engaging surfaces, wherein with the second latch in the second latch first position and with the first latch in the first latch open position, both of the third and fourth latching surfaces are positioned to at least partially abut the first latch engaging surface, and wherein in the second latch second position and with the first latch in the first latch closed position, the third latch engaging surface is positioned to at least partially abut the second latch engaging surface; and a second spring coupled to the body and to the second latch and biasing the second latch to pivot about the second latch pivot axis in a second direction opposite to the first direction, the second spring and pivoting the second latch to the second latch second position upon pivoting of the first latch from the first latch open position in a direction toward the first latch closed position.

As yet another aspect, at least a portion of the first latch engaging surface comprises a concave first latch engaging surface facing away from the hook, the concave first latch engaging surface comprising first and second diverging upwardly sloped surface portions, the first upwardly sloped surface portion being positioned nearer to the distal end of the first latch than the second upwardly sloped surface portion; wherein at least a portion of each of the third and fourth latch engaging surfaces comprise a convex latch engaging surface; and wherein the third latch engaging surface is positioned to at least partially abut the first upwardly sloped portion and the fourth latch engaging surface is positioned to at least partially abut the second upwardly sloped surface portion when the first latch is in the first latch open position and the second latch is in the second latch first position, and wherein the fourth latch engaging surface is positioned to engage the second latch engaging surface when the first latch is in the first latch closed position and the second latch is in the second latch second position.

As another aspect, a towing coupler for a vehicle can comprise: a body comprising a hook with an upwardly facing hook opening and a column portion projecting upwardly from one side of the hook; first latch means pivoted to the body for pivoting about a first pivot axis between first latch open and closed positions; second latch means pivoted to the body for pivoting about a second pivot axis between a second latch first position for engaging and retaining the first latch means in an open position and a second latch second position for engaging and retaining the first latch means in a closed position; the first and second latch means comprising engagement surface means configured for engaging one another when the first latch means is in the first latch open position and the second latch means is in the second latch first position and when the first latch means is in the first latch closed position and the second latch means is in the second latch second position; a first spring biasing the first latch means for pivotal movement about the first pivot axis in first direction toward the open position; and a second spring biasing the second latch means for pivotal movement about the second pivot axis in a direction opposite to the first direction.

The developments disclosed herein include all possible combinations of the above aspects as well as of those described herein and shown in the accompanying drawings.

BRIEF DESCRIPTION OF THE DRAWINGS

In FIG. 1, the first or lower latch is shown in an exemplary latch closed position and the second or upper latch is shown in an exemplary second latch position.

In FIG. 7, the first or lower latch is shown in an exemplary first latch open position and the second or upper latch is shown in an exemplary second latch first position.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phrase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises" and the terms "including" and "having" have the same meaning as "comprising". The terms "upper" and "lower" are used for convenience in describing a towing coupler in the orientation of FIG. 1, it being understood that, for example, the upper latch in FIG. 1 will still be an upper latch even if the orientation of the towing coupler is changed to place the upper latch in a lower or lowest position from the position shown in FIG. 1.

Figure 1:
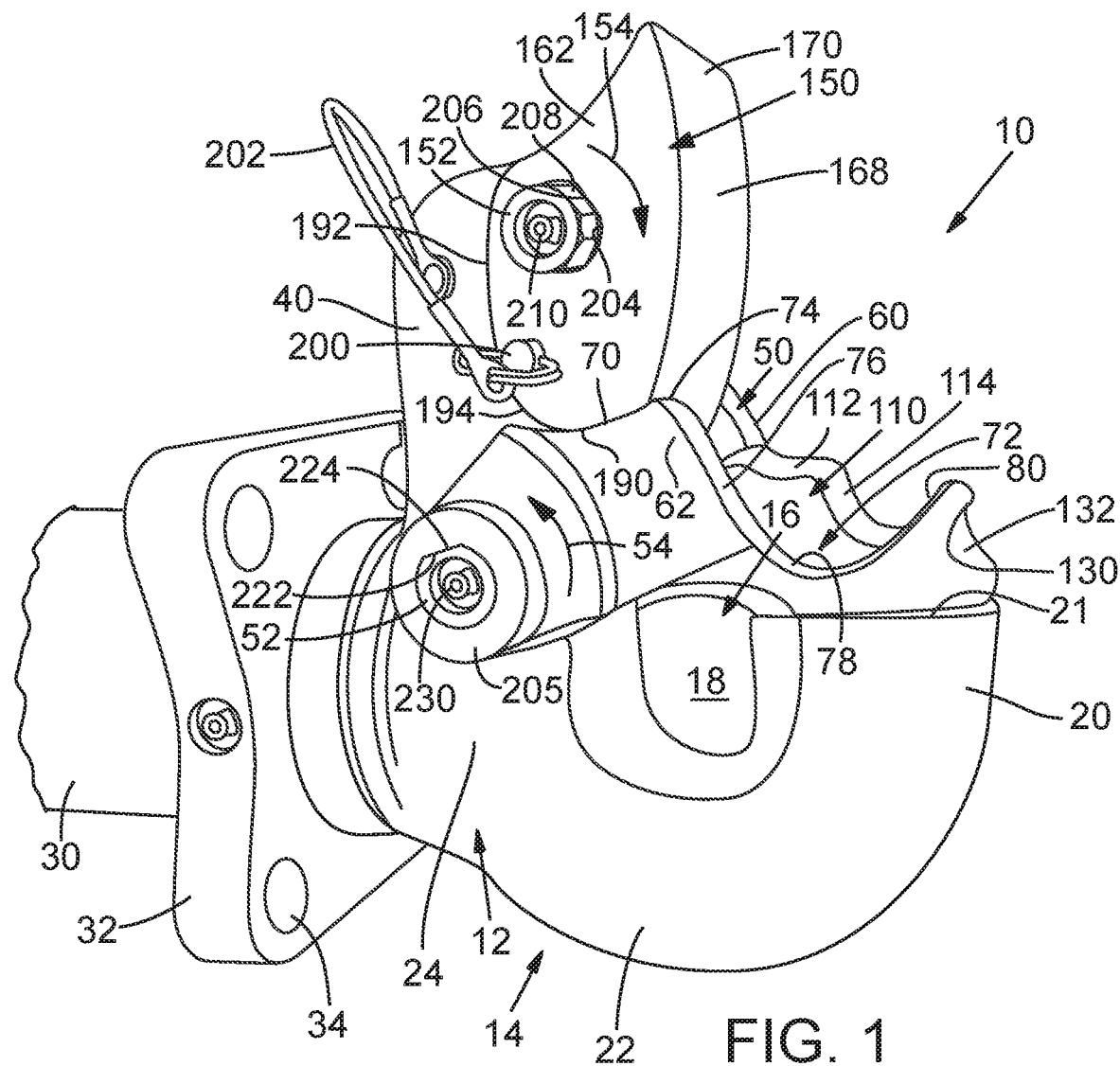
FIG. 1 is a left-side perspective view of an embodiment of a towing coupler in a closed state.

FIG. 1 illustrates an exemplary form of towing coupler or coupler 10 in accordance with this disclosure. Throughout this disclosure, the same numbers are used for common elements in the illustrated views of the coupler.

Referring to FIGS. 1-6, the coupler 10 comprises a body 12. The body 12 includes a hook portion 14 at a front portion of the body. The illustrated hook portion 14 comprises a hook which is open at the top 16 and that defines a drawbar eye receiving opening 18 therein. Specifically, the hook portion 14 includes an upwardly projecting front leg portion 20, a base portion 22 and a rear leg portion 24. The portions 20, 22 and 24 can be an inverted C-shaped configuration with the opening 18 positioned above section 22 and between the sections 20 and 24. A draw bar eye receiving space is provided between the leg portions and the base portion. The body also comprises a rearwardly extending housing 30 that surrounds a section of a shank portion 26 (FIG. 6) of the body 12. The housing 30 comprises a mounting structure or member for mounting the housing 30 and thereby the coupler to the framework of a land vehicle, such as a trailer. In FIG. 1, the mounting structure comprises a flange 32 with respective fastener receiving openings, one of which is indicated at 34, for receiving fasteners, such as bolts, that couple the mounting flange and thereby the coupler 10 to the trailer frame. The body 12 also comprises an upwardly extending latch supporting portion such as a column portion or column 40 projecting upwardly from the leg section 24.

Leg section 20 has an upper surface 21 that can have surface features formed therein, but more desirably is a flat or planar surface.

The illustrated coupler also comprises a lower latch portion 50, which comprises an exemplary form of a first latch, that is pivoted by a pivot pin 52 to a lower section of the column 40, such as above the leg section 24 of the hook portion 14. The pivot pin 52 defines a pivot axis that is desirably perpendicular to the longitudinal axis of the shank portion 26 of the body 12. Desirably the lower latch 50 is biased toward an open position, such as by one or more springs with torsion springs being a specific example. The lower latch is biased in a counter clockwise direction toward an open position in FIG. 1; as indicated by arrow 54 in FIG. 1. When viewed from the right side as in FIG. 2, the biasing force toward an open position is in a clockwise direction as indicated by arrow 55. The latch 50 comprises a proximal end portion adjacent to the column 40 and a distal end portion projecting away from the proximal end portion. The lower latch 50 can comprise spaced apart shoulder portions 60, 62 at the proximal end portion of the latch 50. The shoulder portions 60, 62 are respectively positioned in this example on opposite sides of the column 40. The pin 52 extends through shoulder portion 62, the column 40 and the shoulder portion 60; and is retained in place, such as by a snap ring 64, not shown in FIG. 1, but shown in FIG. 13.

Figure 2:
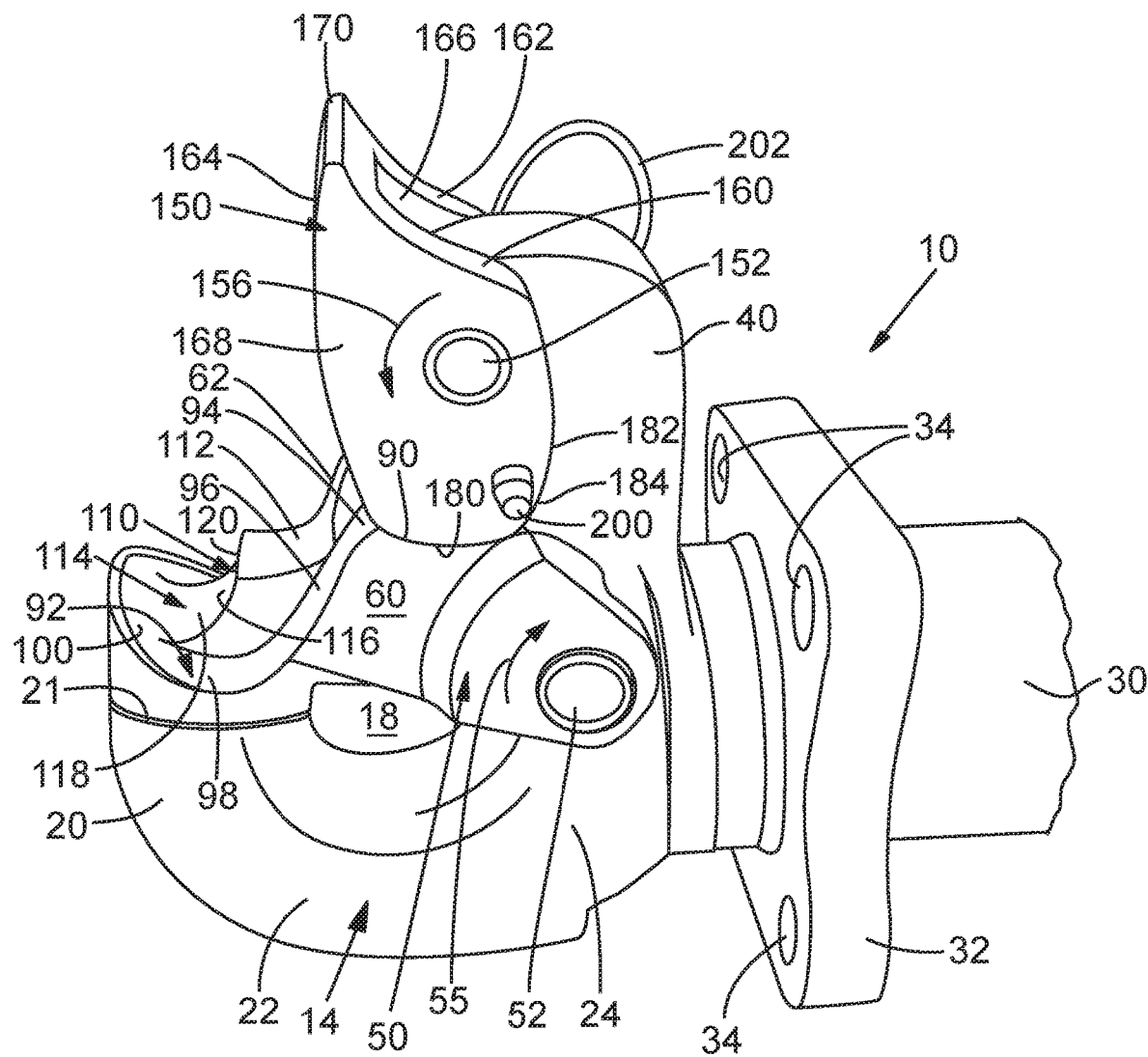
FIG. 2 is a right-side perspective view of the closed towing coupler of FIG. 1.

As can be seen in FIG. 1, when the coupler is closed, the latch 50 comprises an upwardly facing first latch engagement surface 70 and an upwardly facing second latch engagement surface 72. The surfaces 70, 72 are desirably at least partially or entirely concave and other engagement surfaces of the upper and lower latches are desirably at least partially or entirely concave. A ridge or peak 74 is positioned between the surfaces 70 and 72. The surfaces 70, 72 diverge moving downwardly away from the peak in the form shown. Similar surfaces at the opposite side of the latch 50 can be considered to be part of the first latch engagement surface or considered as separate first latch engagement surfaces. The surfaces 70, 76, 78, and 80 (and the corresponding surfaces at the opposite side of the latch comprise a form of latching surfaces. The surface 72 has an upwardly sloped first surface portion 76, a base surface portion 78 (further from pin 52 than, or more distally than, the surface 76) and an upwardly facing distally positioned sloped surface 80. The radius of curvature of surface 70 is desirably smaller than the radius of curvature of surface 72 in this embodiment. In effect, the surface comprising surface portions 76, 78 and 80 can be sinusoidal in shape. In the same manner, as can be seen in FIG. 2, the first latch 50 can comprise an upwardly facing first concave engagement surface 90 and a second upwardly facing concave engagement surface 92. A ridge or peak 94 is positioned between the surfaces 90 and 92. The surface 92 has an upwardly sloped first surface portion 96, a base surface portion 98 (further from pin 52 than the surface 96) and an upwardly facing sloped surface 100. The radius of curvature of surface 92 is desirably greater than the radius of curvature of surface 90 in this embodiment. In effect, in this embodiment the surface comprising surface portions 96, 98 and 100 can be sinusoidal in shape.

A land 110 is desirably positioned between the sloping surfaces 72 and 92 of the respective legs 62, 60. The land extends upwardly above the surfaces 76, 96 and 78, 98. The land comprises a first upwardly facing land concave surface 112 and a second upwardly facing land concave surface 114. As can be seen in FIG. 2, the land 110 starts at a location below the respective peaks 74, 94 and extends downwardly to a ridge 120 between the concave land surfaces 112, 114. The radius of curvature of surface 112 is smaller than the radius of curvature of surface 114 in this example. In addition, the radius of curvature of surface 114 is greater than the radius of curvature of the surfaces 78 and 98. Surface 114 comprises an upwardly sloping surface 116, a base surface 118 and a forward surface 120. In this example, the forward surface 120 is of the same slope as surfaces 80, 100 to provide a smooth surface across the distal end of the upper portion of the lower latch 50. The illustrated land 110 also comprises a rear upwardly sloping surface 113 that desirably abuts the front surface 117 (shown in FIG. 6) of the column 40 when the latch 10 is in an open position as explained below in connection with FIG. 12.

As shown in FIG. 1, the distal end 130 of the lower latch 50 can comprise a recess 132 for use in gripping by a user to pull and pivot the lower latch 50 in a direction counter to the directions 54, 55 in which the lower latch 50 is biased. This will be explained more fully below.

The illustrated coupler also comprises an upper or second latch 150. The upper latch 150 is coupled by a pin 152 to the column 40 such that latch 150 is rotatable or pivotal relative to the column. The pivot axis defined by upper latch pin 152 is desirably perpendicular to the longitudinal axis of the shank 26 (FIG. 6) and parallel to the pivot axis defined by lower latch pin 52. The pivot axis defined by pin 152 is positioned above and forwardly of the pivot axis defined by the pin 52. The upper latch 150 is desirably biased about pin 152 in the opposite direction of biasing the lower latch 50 about pin 52. The biasing of upper latch 150 can be accomplished, for example, by one or more springs, such as by torsion springs as explained below. When viewed from the left as in FIG. 1, the upper latch 150 is biased in a clockwise direction as indicated by arrow 154. When viewed from the right as in FIG. 2, the upper latch 150 is biased in a counter clockwise direction as indicated by arrow 156.

Figure 7:
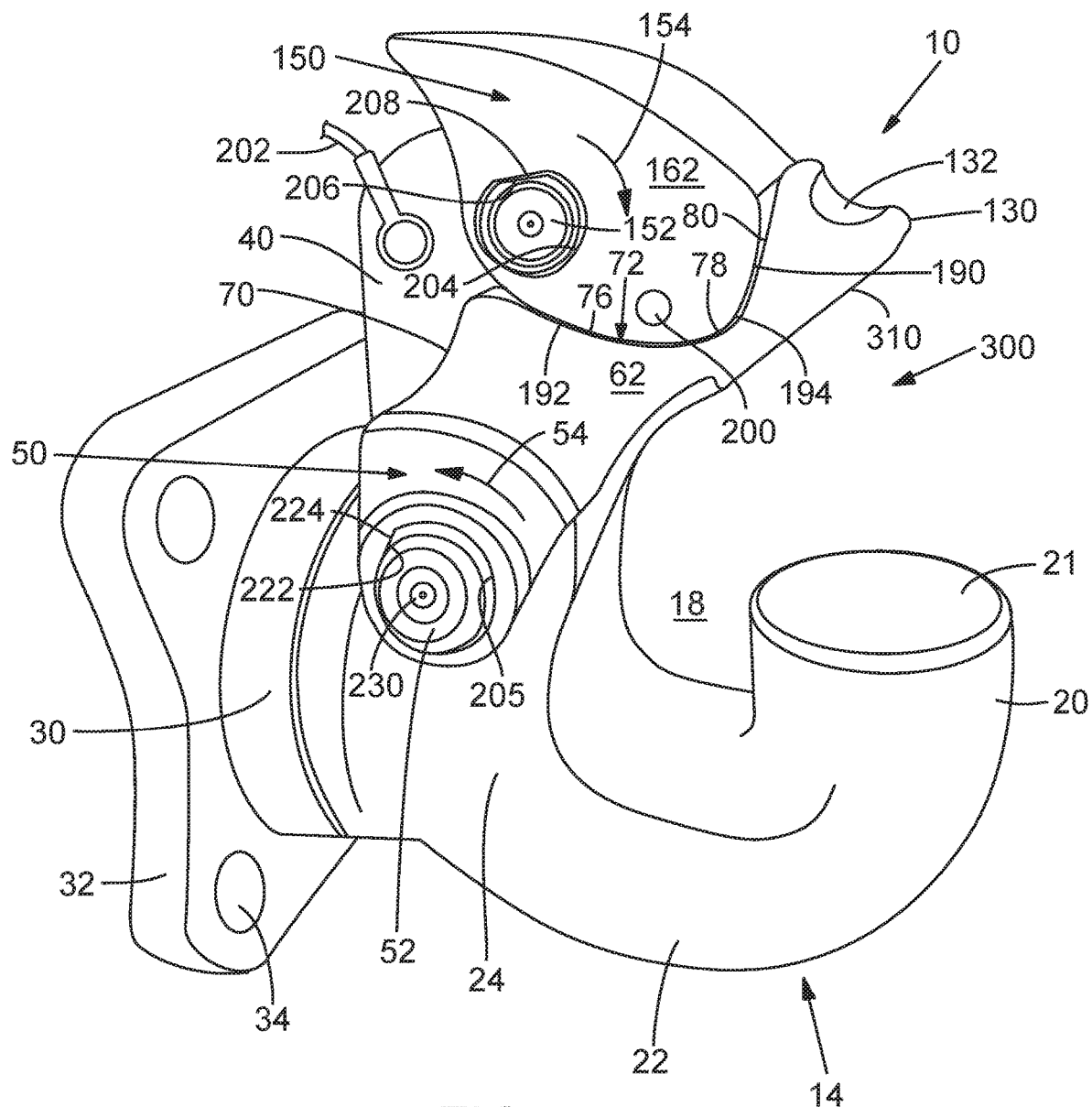
FIG. 7 is a left-side perspective view of the towing coupler of FIG. 1 shown in an open state ready, for example, to receive a drawbar eye attached to a vehicle for coupling to the coupler.

In FIG. 1, the lower or first latch 50 is shown in a closed position with the distal end of the lower latch engaging the leg 20 of the hook and closing off access to the draw bar receiving space. Less desirably, in the closed position, the distal end of the latch can be spaced from the leg 20 by a gap that is small enough to prevent removal of a draw bar from the draw bar receiving space when the lower latch is closed. In addition, in FIG. 1, the second or upper latch 150 is shown in a second position. In FIG. 7, the second latch is shown in a first position and the lower latch is shown in an open position.

As can be seen in FIG. 2, the upper latch 150 can comprise first and second spaced apart legs 160, 162 projecting rearwardly from a front portion 164 of the body 168 that comprises the upper latch 150. A channel 166 can be provided between the legs 160, 162 and an upper front portion of the column 40 can be positioned between the legs 160, 162 and between latching surfaces at the outer surfaces of the legs that face respective latching surfaces of the lower latch. The latching surfaces of the upper and lower latches are configured to at least partially engage one another to retain the lower latch in the position to which it is moved. The latch 150 comprises an upwardly extending latch engagement portion 170 that projects above the axis of pin 152 and that has a forward portion extending forwardly of a vertical plane through the axis of pin 152 when the upper latch is in the closed position shown in FIG. 2. The upper latch leg 160 comprises a first convex lower latch engaging surface 180 (lower when in the position shown in FIG. 2). The first lower latch engaging surface 180 is spaced from the latch actuating portion 170. The first latch engaging surface 180 is positioned at opposite sides of a horizontal plane extending through the axis of the pin 152 when the upper latch is in the position shown in FIG. 2. The leg 160 also comprises a second concave lower latch engagement surface 182. The second lower latch engagement surface 182 is positioned rearwardly of a vertical plane through the axis of pin 152 when the upper latch is in the position shown in FIG. 2. In addition, an arcuate transition surface 184 extends between the surfaces 180 and 182. The leg 162 shown in FIG. 1 has a similar first convex lower latch engagement surface 190 and a second rearwardly positioned concave lower latch engagement surface 192 with an arcuate transition surface 194 positioned between the surfaces 190 and 192.

When the latch is in the closed position as shown in FIGS. 1 and 2, the first lower latch engaging surface 190 abuts the lower latch surface 70 and the first lower latch engaging surface 180 abuts the lower latch surface 90. In addition, springs bias the upper latch 150 in the directions of arrows 154, 156 and urges these surfaces 190, 70 and 180, 90 together. In addition, the peaks 74, 94 of the respective shoulder 62, 60 retain the upper latch in this engaged position. For added safety, a safety pin 200 is inserted through the legs 162, the column 40 and the leg 160 to further retain the upper latch 150 against the lower latch 50 when the latch is in the closed position. The pin 200 can be coupled to the column 40 by a cable 202.

With reference to FIGS. 1 and 2, the surfaces 72, 92 comprise a form of first latch engagement surface. In addition, the surfaces 70, 90 comprise a form of second latch engagement surface. Also, the surfaces 180, 190 comprise a form of a third latch engagement surface and the surfaces 182, 192 comprise a form of a fourth latch engagement surface.

Figure 6:
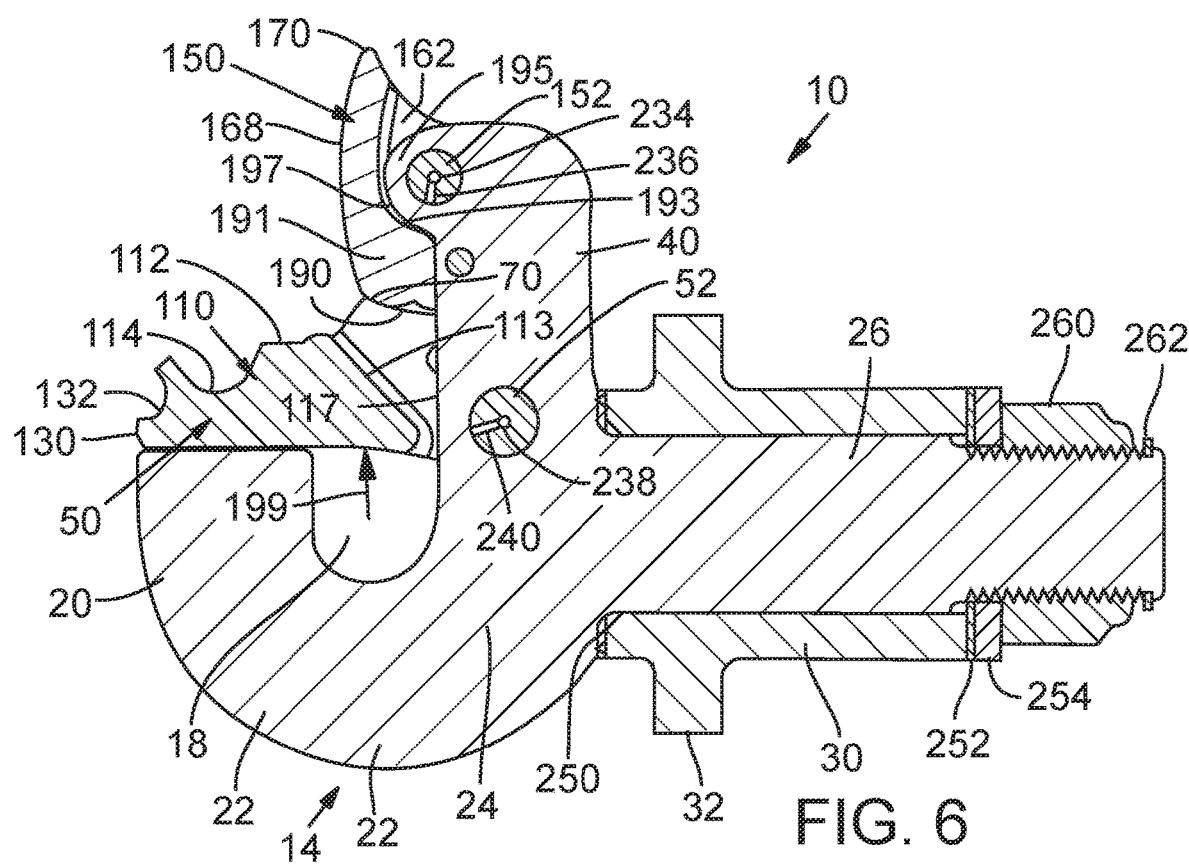
FIG. 6 is a vertical sectional view of the closed towing coupler of FIG. 5 taken along line 6-6 of FIG. 5.

Referring to FIG. 6, the upper latch has a base portion 191 with the first lower latch engaging surfaces 180, 190 at the lower end of the base portion 191 in FIG. 6. The first lower latch engaging surfaces desirably span from side to side of the upper latch 150. The base portion 191 can also comprise an upper concave surface 193 opposed to the surfaces 180, 190. In addition, the column 40 can comprise a forwardly projecting nose portion 195 positioned above the surface 193. The nose portion can have a convex outer surface 197 configured to match the concavity of the surface 193 such that as the upper latch pivots about the axis of pin 152, the surfaces 193, 197 remain proximate to one another. In the closed positon shown in FIG. 6, the service load applied by a draw bar eye is generally in the direction of arrow 199. If the pin 152 were to fail, the upper latch is captured between the surfaces 190, 70, 193 and 197 (in FIG. 6 and surfaces 180, 90, 193 and 197) at the opposite site of the latch to retain the upper and lower latches 150, 50 in the closed position. That is, if the upper latch pin 152 were to fail from the applied force 199, the concave geometry of the upper latch 150 (surface 193) will contact the convex geometry of the surface 197 of the nose portion 195 of the coupling body 40 and prevent the latch from opening. The lower latch 50 contacts the upper latch 150 in a manner that compresses the upper latch 150 against the coupling body 40.

Figure 12:
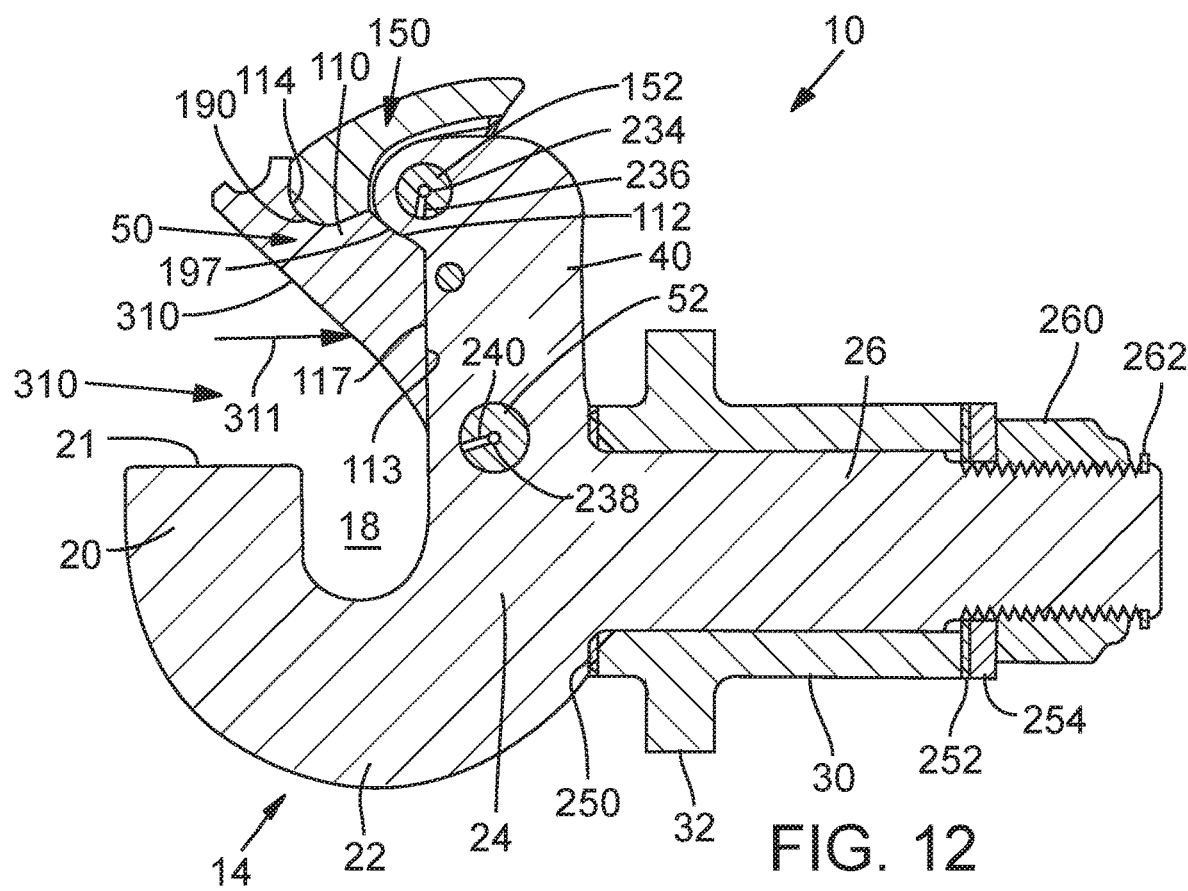
FIG. 12 is a vertical sectional view of the open towing coupler of FIG. 11, taken along line 12-12 of FIG. 11.

Desirably, the pins 52 and 152 rotate with the rotation of the latches for lubrication purposes. Although the pin 52 can be keyed to the lower latch 50 and the pin 152 can be keyed to the upper latch 150, in one exemplary approach inter-engaging features are provided between pin 52 and the lower latch and between pin 152 and the upper latch 150 that cause the respective pins to pivot with pivoting motion of the latches. For example, the opening 204 through which pin 152 extends can be provided with a flat surface 206 where the opening passes through leg 62 of the lower latch. In addition, the pin 152 can have a flat surface 208 that abuts the surface 206 with the surfaces 206, 208 preventing the relative rotation of the upper latch 150 and the pin 152. In the same manner, the opening 205 through which pin 52 extends can be provided with a flat surface 222 where the opening passes through leg 162 of the upper latch. In addition, the pin 52 can have a flat surface 224 that abuts the surface 222 with the surfaces 222, 224 preventing the relative rotation of the lower latch 50 and the pin 52. The pins 52, 152 can have respective grease ports 230, 210 communicating with respective axially extending passageways extending from the grease ports along a portion of the length of the respective pins. FIG. 6 and FIG. 12 illustrate the axial extending passageway 234, 238 in the pins 152, 52. A radially extending passageway 236 can communicate from axial passageway 234 to the surfaces between pin 152 and the column 40. A radially extending passageway 240 extends between the axial passageway 238 and the surfaces between pin 52 and the column 40. Although optional, with this construction, grease introduced through the respective grease ports 210, 230 is dispersed to the surfaces between the pins and column and is dispersed by the motion of the pins as the upper and lower latches rotate to more effectively lubricate the pins and column.

Figure 3:
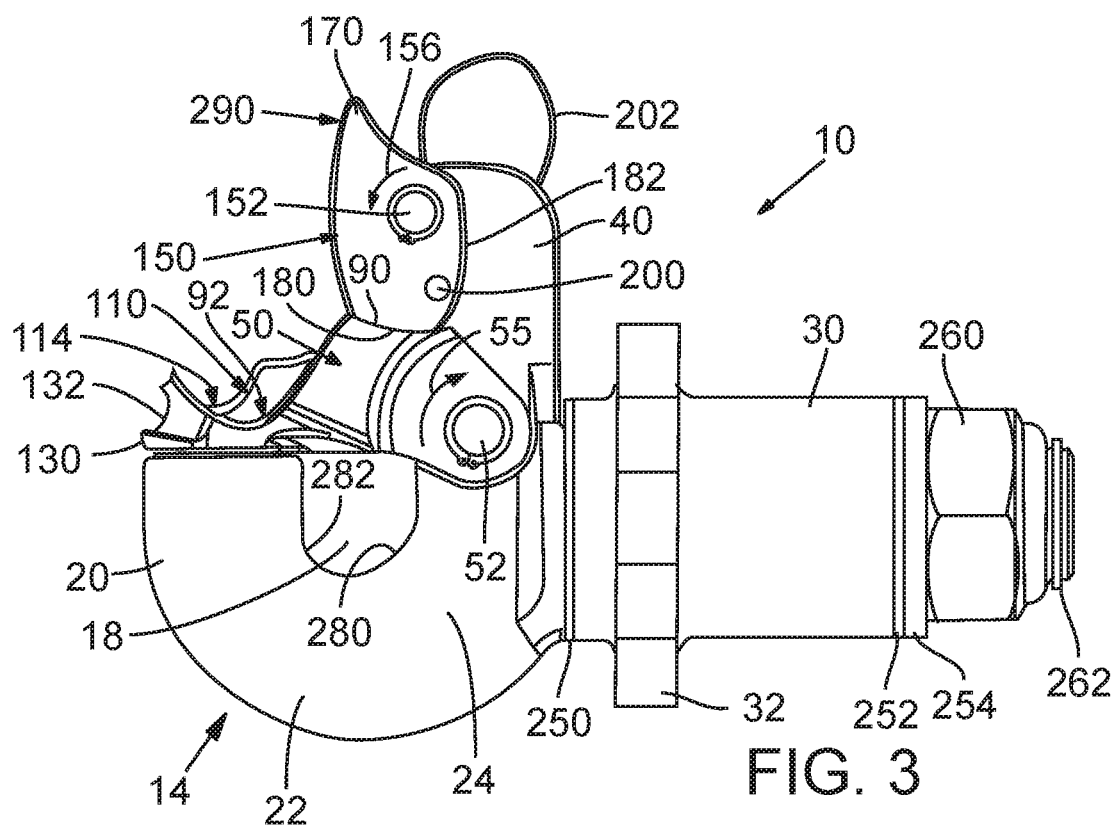
FIG. 3 is a side elevational view of the closed towing coupler of FIG. 1.
Figure 4:
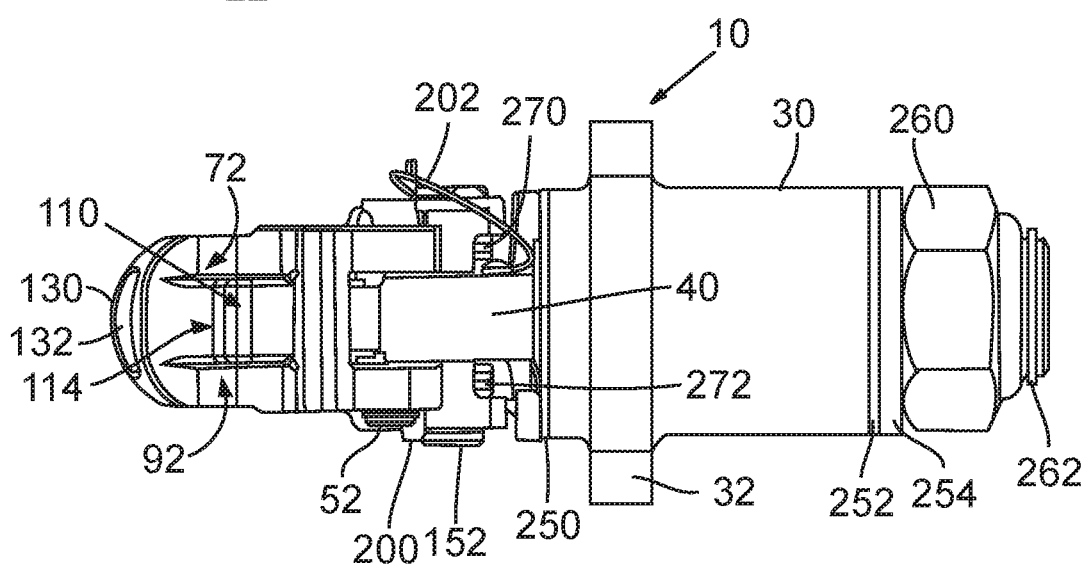
FIG. 4 is a top plan view of the closed towing coupler of FIG. 1.
Figure 5:
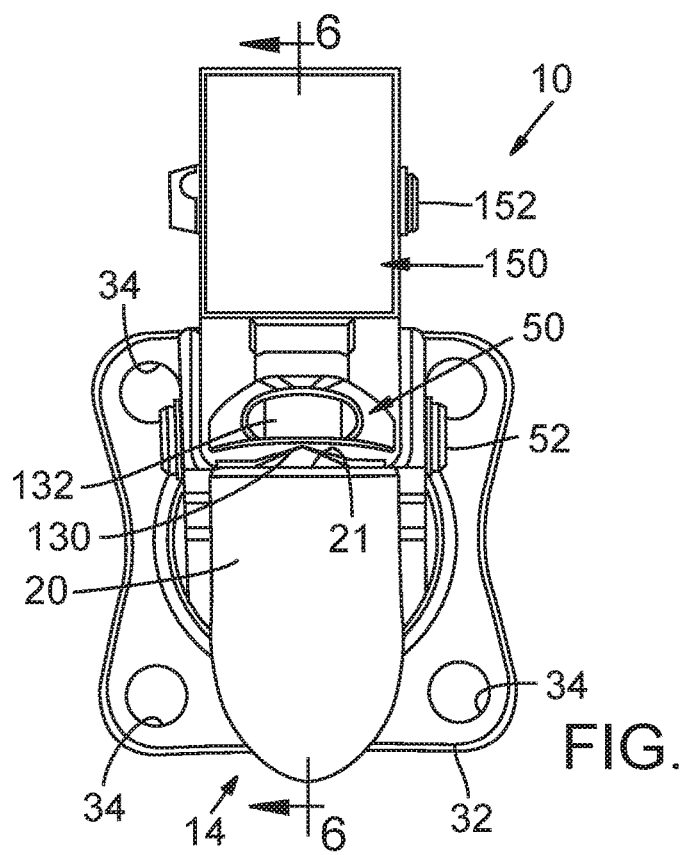
FIG. 5 is a front elevational view of the closed towing coupler of FIG. 1.

With reference to FIGS. 3-6, the description of FIGS. 1 and 2 applies to these FIGS. and components in common between this FIGS. will not be redescribed. FIGS. 3 and 4 illustrate additional portions of an exemplary housing 30. The housing 30 pivotally receives a shaft portion 26 of the body 14 (FIG. 6). A first bearing, such as a ring 250 is positioned between the front portion of the housing 30 and the column 40. A second bearing, such as a ring 252 is positioned between a rear portion of the housing and a spacer 254. As a desirable example, these rings 250, 252 can comprise polymer washers that in effect seal the ends of the housing and retain lubricant in the surfaces between the shaft 26 and housing 30. In addition, the polymer rings can be of a reduced or low friction material, such as a nylon material, to further facilitate the pivoting movement of the body, and thereby the hook portion 14 and shaft 26, of the coupler relative to the housing 30. A nut 260 threaded onto the distal end of the shaft 26 bears against the spacer 254. A retainer, such as a snap ring 262, prevents the nut from separating from the shaft 26. As a specific example, the nut 260 can be a nylon lock nut which allows the nut to be tightened against a spacer 254 as desired to set the resistance to pivoting movement between the housing 30 and the shaft 26. As can be seen in FIG. 4, springs 270, 272, which can comprise torsion coil springs, can be positioned on opposite sides of the column 40 to bias the upper latch 150 in the direction 156 shown in FIG. 3.

With further reference to FIG. 3, the opening 18 between hook sections 20, 22 and 24 can be asymmetrical when viewed from the side. That is, the radius of curvature of the opening 18 is smaller at a rear portion 280 than at a front portion 282. This construction allows a received drawbar eye to pivot within the opening 18 upwardly, relative to a horizontal plane when the latch coupler is vertical, a lesser extent than the allowed downward pivoting of the received drawbar eye. As explained below, the drawbar eye in one specific example can pivot upwardly through an angle of 35 degrees with respect to horizontal plane and downwardly 40 degrees when the coupler 10 is in a vertical orientation. This aids in the prevention of coupler and drawbar eye binding when articulated in vertical directions, such as can occur in extreme off-road terrain conditions, including large raised and lowered surfaces separated by a short distance relative to the wheelbase or track of the vehicle (e.g., a large mound followed by a deep ditch).

FIGS. 7-12 illustrate the latch 50 in an open position with a gap 300 between the lower latch 50 and the hook portion 14. Elements in these FIGS. that have been discussed above are not discussed in detail below except where helpful in understanding the operation of the coupler 10. To shift the latch between the closed position shown in FIG. 3 to the open position shown in FIG. 7, a user can apply a force in a direction of arrow 290 to the upper portion 170 of the upper latch 150 as shown in FIG. 3. The force 290 acts against the bias of the springs 270, 272 and rotates the upper latch 150 in a direction counter to the directions 154, 156. As surfaces 70, 190 and 90, 180 clear one another, the bias on the lower latch 50 in the direction of arrows 54, 55 pivots the lower latch 50 to the open position as shown in FIG. 7.

Figure 8:
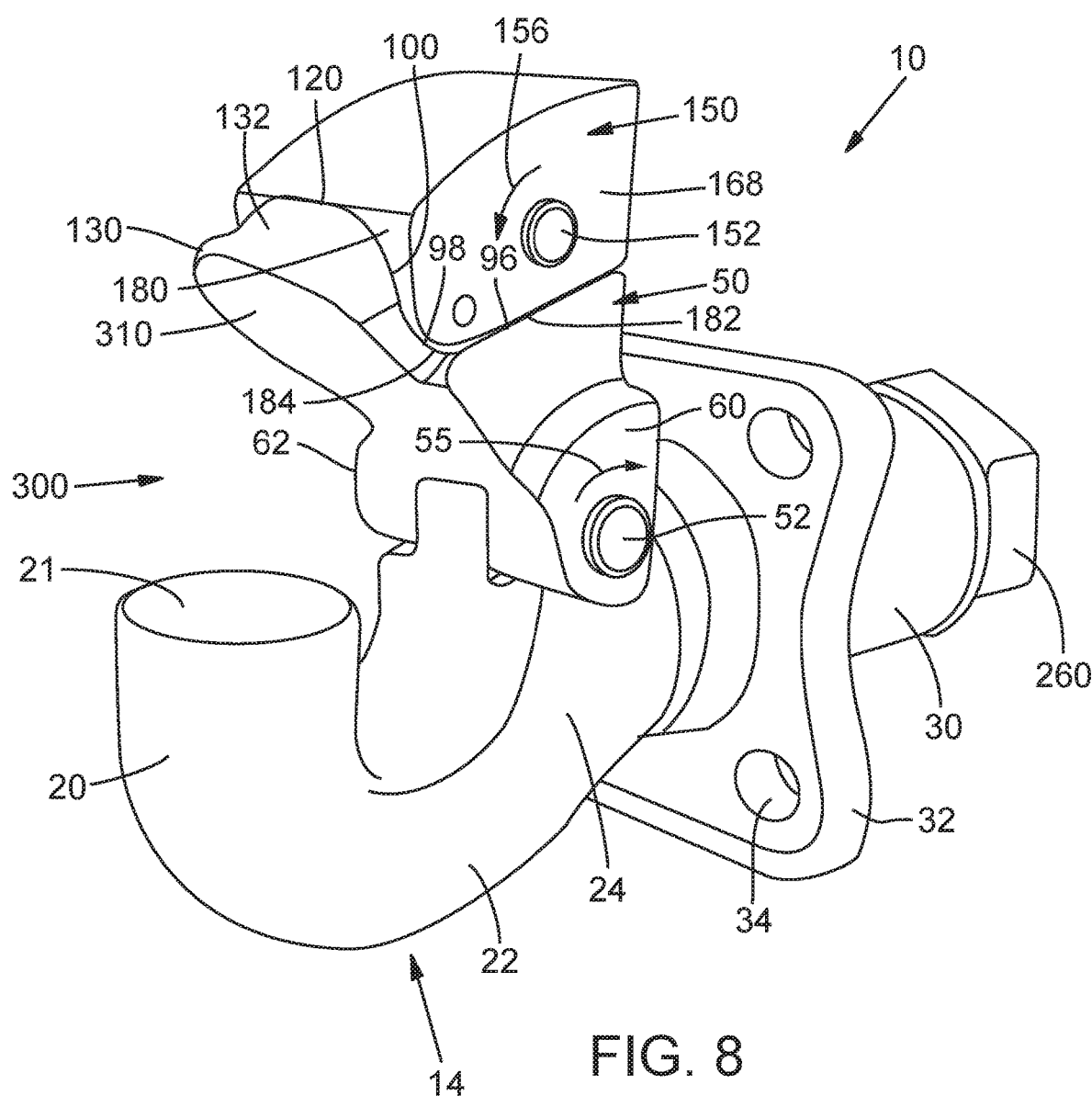
FIG. 8 is a right-side perspective view of the open towing coupler of FIG. 7.
Figure 9:
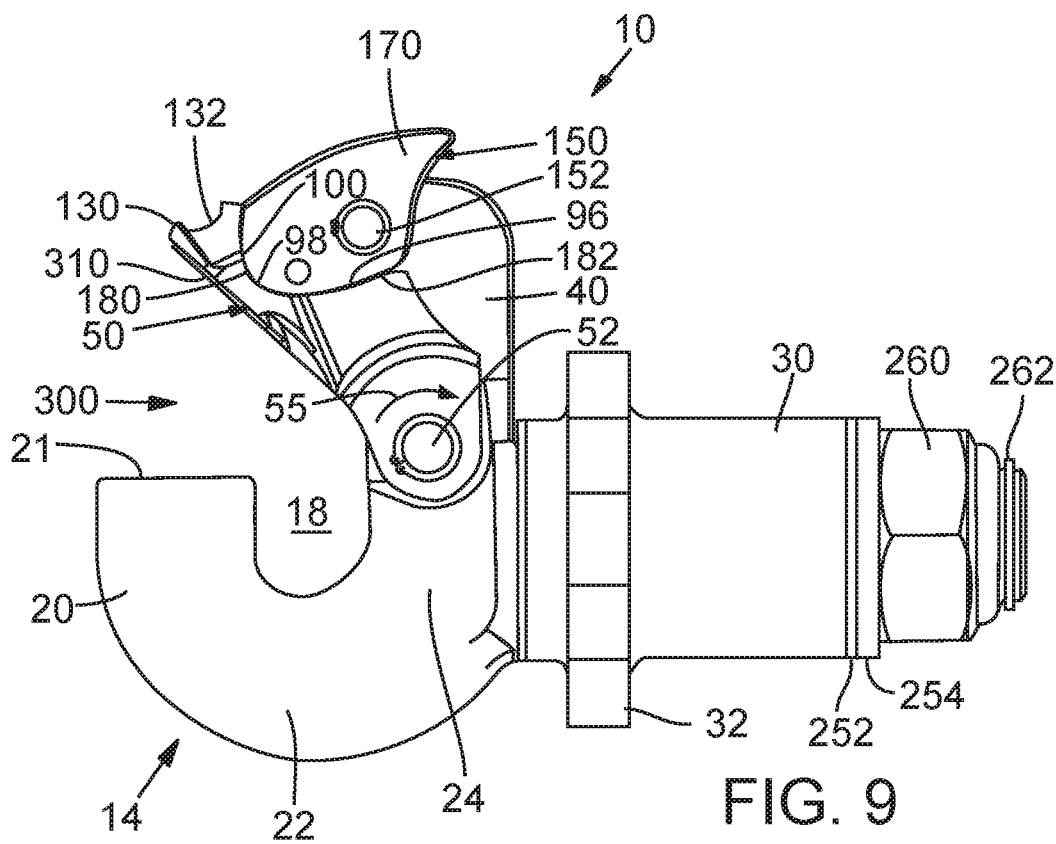
FIG. 9 is a side elevational view of the open towing coupler of FIG. 7.
Figure 10:
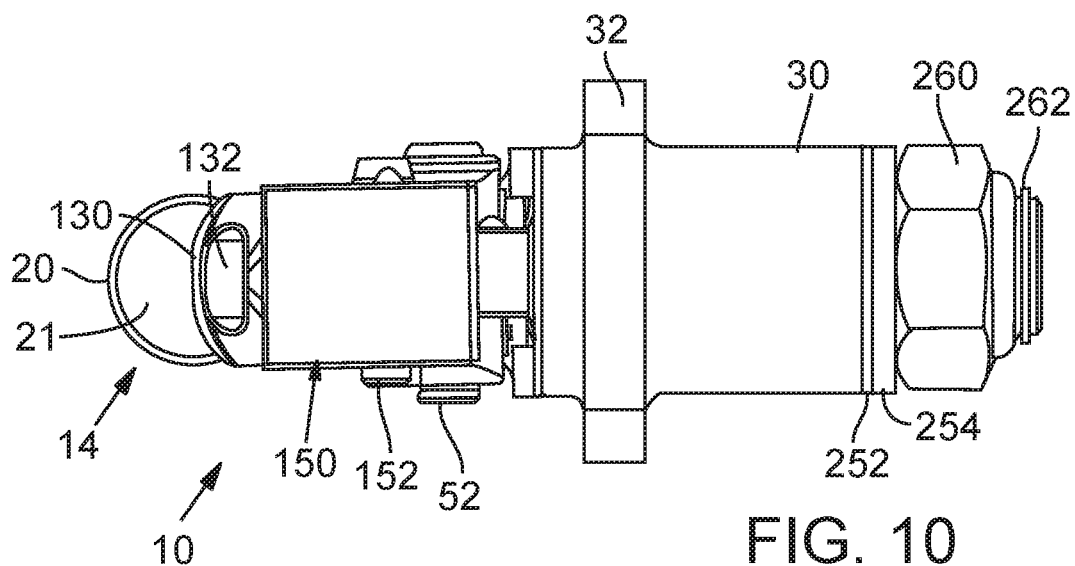
FIG. 10 is a top view of the open towing coupler of FIG. 9.
Figure 11:
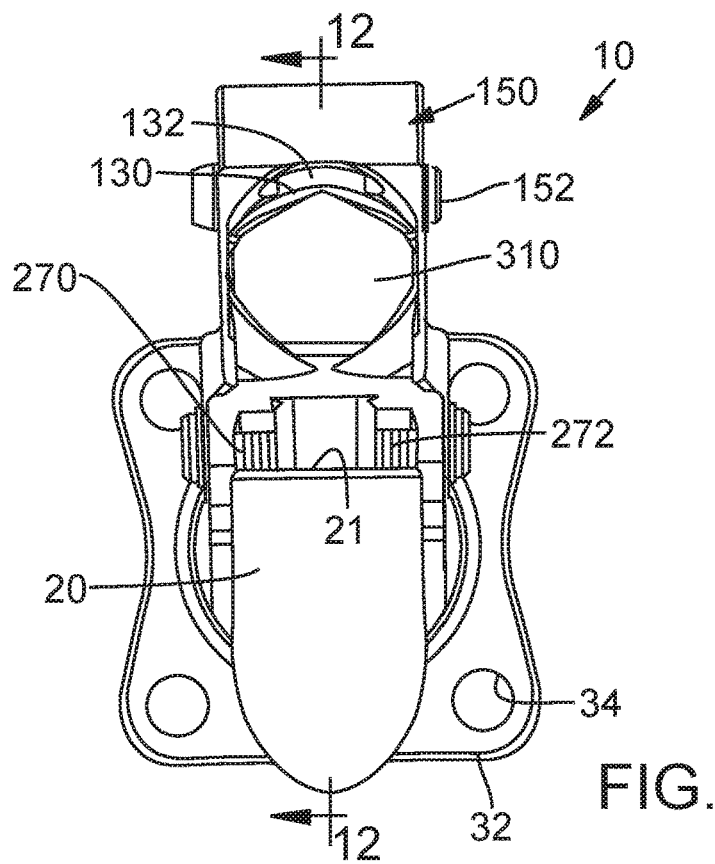
FIG. 11 is a front elevational view of the open towing coupler of FIG. 9.

When in the position shown in FIGS. 7 and 8, the surfaces 190, 192 and 194 of the upper latch 150 are desirably positioned respectively to engage the surfaces 80, 76 and 78 of the lower latch 50 and the surfaces 182, 184 and 180 of the upper latch are positioned to respectively engage the surfaces 96, 98 and 100 of the lower latch. These respective facing upper and lower latch surfaces desirably at least partially engage one another and more desirably a majority of these facing surfaces are coupled together, such as abutting one another, and most desirably substantially all (more than ninety percent) of these facing surfaces are coupled together such as abutting and thereby engaging one another as shown in part in FIG. 12. Also, although not shown in these figures, except partially in FIG. 12, the land 110 of lower latch 50 is positioned at least partially between the legs 162, 160 of the upper latch 150. In addition, the surface 112 of the land 110 desirably engages the surface 197 of the column and the surface 113 of the land desirably engages the surface 117 at the front of the column 40. In addition, the surface 114 of the land desirably engages the surface 190 of the upper latch 150. These respective pairs of facing surfaces, 112, 197; 113, 117; and 114, 190; desirably at least partially engage one another and more desirably a majority of these facing surfaces are coupled together, such as abutting one another, and most desirably substantially all of these facing surfaces are coupled together such as abutting and thereby engaging one another as shown in part in FIG. 12.

It is not unusual for the coupler of a truck or trailer being backed up toward the coupler 10 to apply a substantial force in the direction of arrow 311 in FIG. 12. By having the respective above described engaging surfaces effectively backing the lower latch 50 up by the column and upper latch, forces applied in the direction of arrow 311 are distributed over the entire coupler assembly rather than having one component (e.g. the lower latch or a portion thereof) bearing substantially the entire load. These loading forces result in compressive loading of the majority of the coupler components when the latch is in the open position. Positioning of the land between the legs 160, 162 of the upper latch 150 in the open position also assists in maintaining the vertical alignment of the upper and lower latches 50, 150.

To move the latch from the open position shown in FIG. 7 to the closed position shown in FIG. 1, a user can pull on the lower latch, such as by engaging the recess 132 to urge the lower latch in a clockwise direction in FIG. 7, counter to the bias applied by one or more springs to the lower latch 50 in the direction of arrows 54, 55 in FIGS. 7 and 8.

As can be seen in FIGS. 7 and 8, the undersurface of the lower latch 50 indicated at 310, is angled downwardly from front to rear, when the coupler is in a vertical orientation, and with surfaces 113, 117 in engagement with one another as shown in FIG. 12. As a result, the surface 310 assists in guiding a drawbar eye downwardly into the hook portion 14. That is, assuming for example that a truck is backing up, upon engaging the surface 310, the drawbar eye will tend to slide downwardly along the surface 310 into the opening 18 of the hook portion 14.

Figure 13:
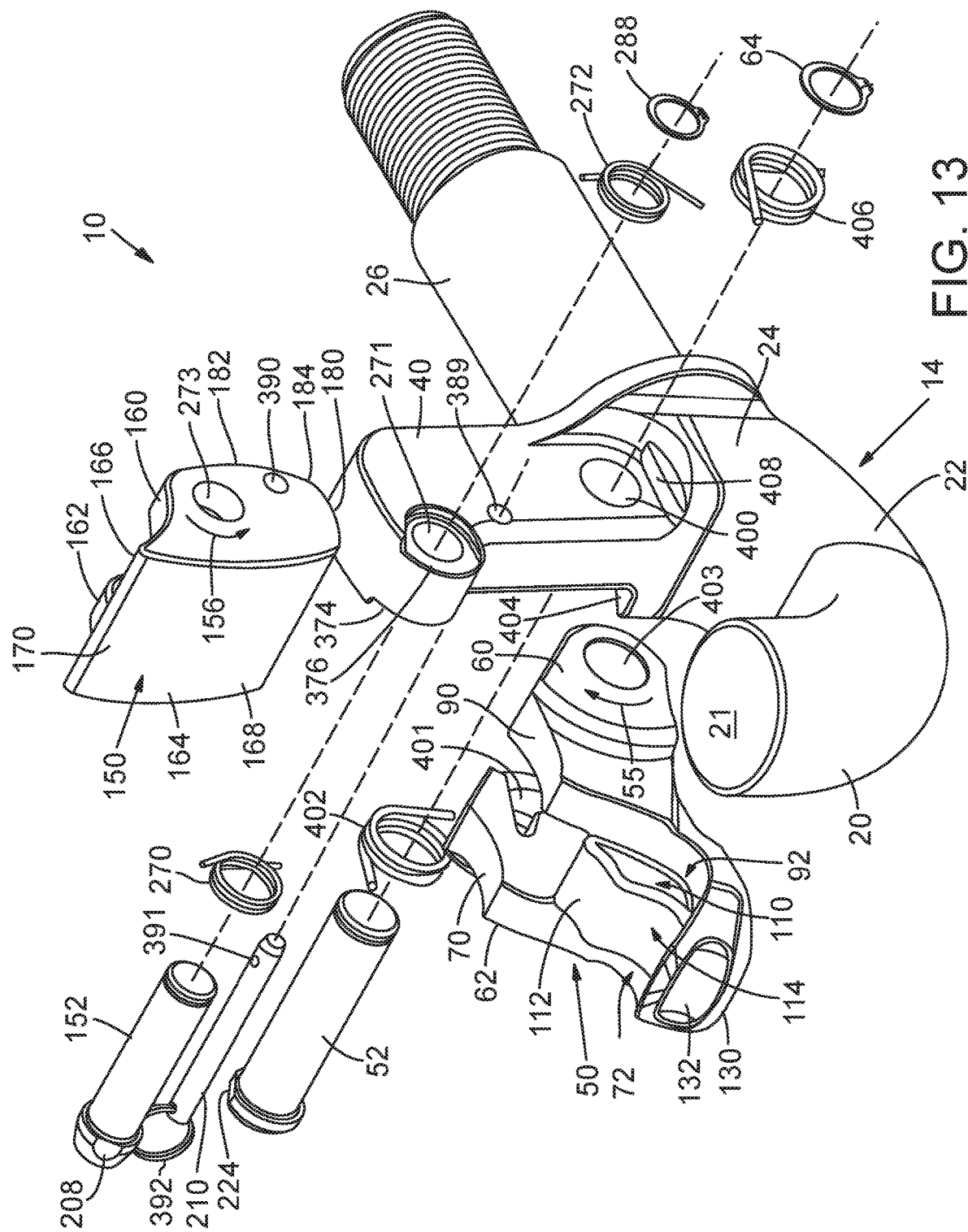
FIG. 13 is an exploded view of a towing coupler of FIG. 1 without the housing shown in FIG. 1.
Figure 19:
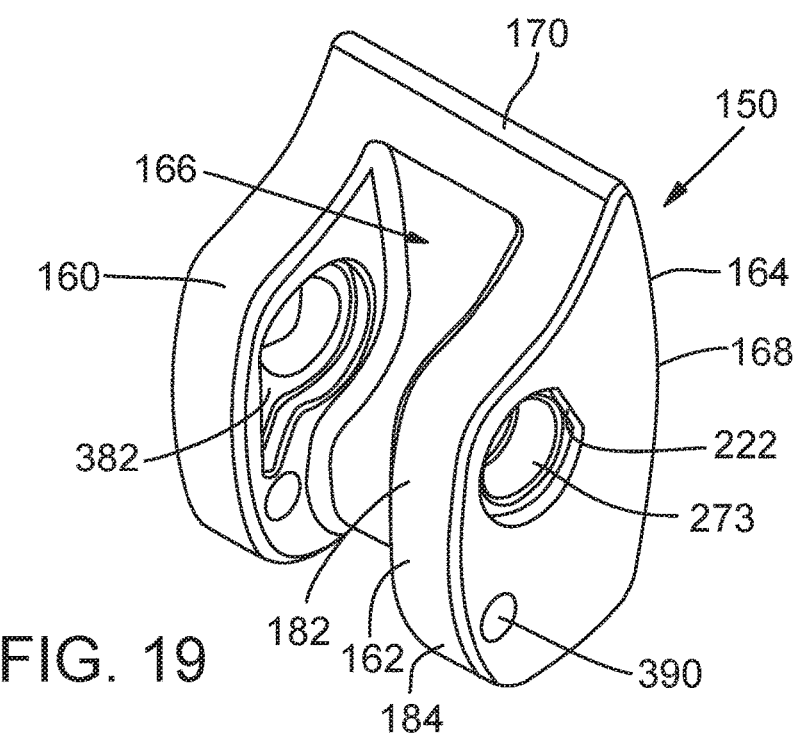
FIG. 19 is a rear perspective view of one form of an upper latch for the towing coupler embodiment of FIG. 1.

Referring to the exploded view of FIG. 13, which omits the housing 30 for convenience, the upper latch pin 152 is inserted through the opening 204 comprising an opening in leg 162 (not shown in FIG. 13), an opening 271 in the column 40 and through an opening 273 in the leg 160 of the upper latch 150. The upper latch 150 is desirably biased as explained above relative to the column 40 by, for example, a spring engaging the upper latch and the column. For example, a spring 270, such as a coiled or torsion spring, can be positioned within a seat 374 at the left side of the column 40 and can surround the opening 271. A similar spring 272, which can be a coiled or torsion spring, can be positioned within a seat 376 at the right side of the column 40 and can surround the opening 271. One end of spring 270 can engage the seat 374 and the opposite end of the spring 270 can engage a seat in upper latch 150 that is like the seat 382 shown in FIG. 19A. In addition, one end of the spring 272 can engage the seat 376 and the opposite end of the spring 272 can engage the seat 382 of the upper latch 150. The respective springs 270, 272 apply a biasing force in the direction of arrows 154 (FIG. 1) and 156 (FIGS. 2 and 13). A snap ring 288, or other fastener, can be used to retain the pin 152 in place when the coupler 10 is assembled.

The safety pin 210 is inserted through an opening through leg 162 (not shown in FIG. 13), through an opening 389 through column 40 and through an opening 390 in leg 160 of the upper latch 150 when the latch is in a closed position. The pin 210 can have a spring biased détente 391 that retains the safety pin in place until such time as a ring 392 at the opposite end of the safety pin from the détente is pulled to cause the détente 391 to retract and allow the removal of the safety pin.

Figure 18A:
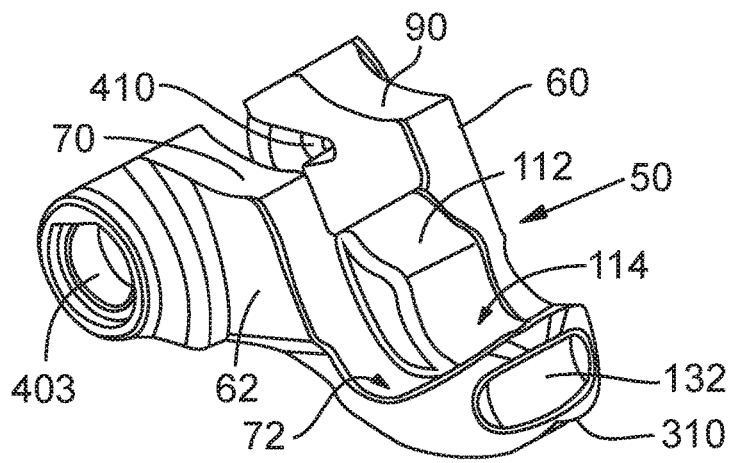
FIGS. 18A and 18B show respective perspective views of one form of lower latch for the towing coupler embodiment of FIG. 1.
Figure 18B:
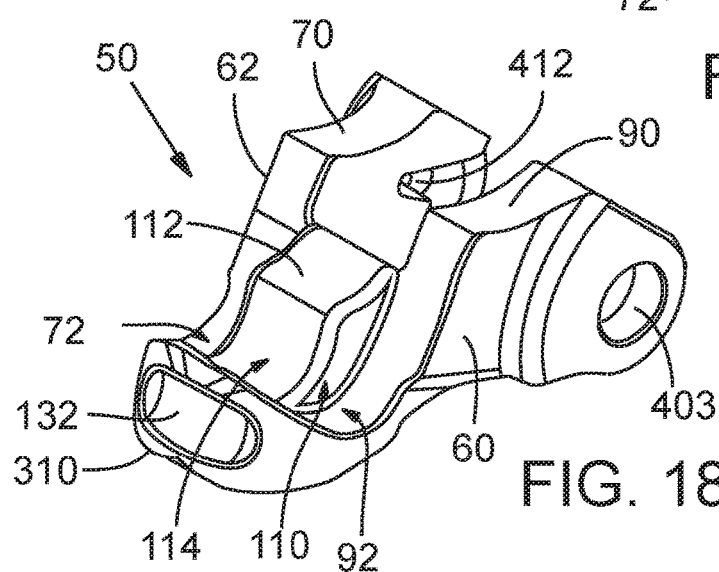

The lower latch pin 52 is inserted through an opening 205 comprising an opening 401 in shoulder 62 of the lower latch 50, an opening 400 in the column 40 and an opening 403 through the leg 60 of the lower latch. The lower latch 50 is desirably biased as explained above relative to the column 40 by, for example, a spring engaging the lower latch and the column. For example, a spring 402, such as a coiled or torsion spring, can be positioned in a seat 404 of the column 40 with one end of the spring engaging the seat. A spring 406, such as a coiled or torsion spring, can be positioned within a seat 408 of the column at the opposite side of the column from the seat 404. One end of the spring 406 can engage the seat 408. The springs 402, 406 are thus positioned between the column and the interior surface of the adjacent legs 62, 60. The shoulders 60, 62 are each provided with a respective seat for engaging the opposite end of each spring from the end engaged by the respective column seat. FIG. 18A shows an exemplary spring engagement seat 410 in the shoulder 60 and FIG. 18B shows a spring engagement seat 412. The springs 402, 406 bias the lower latch in the direction indicated by arrows 54 and 55 in FIGS. 7 and 8.

Figure 14:
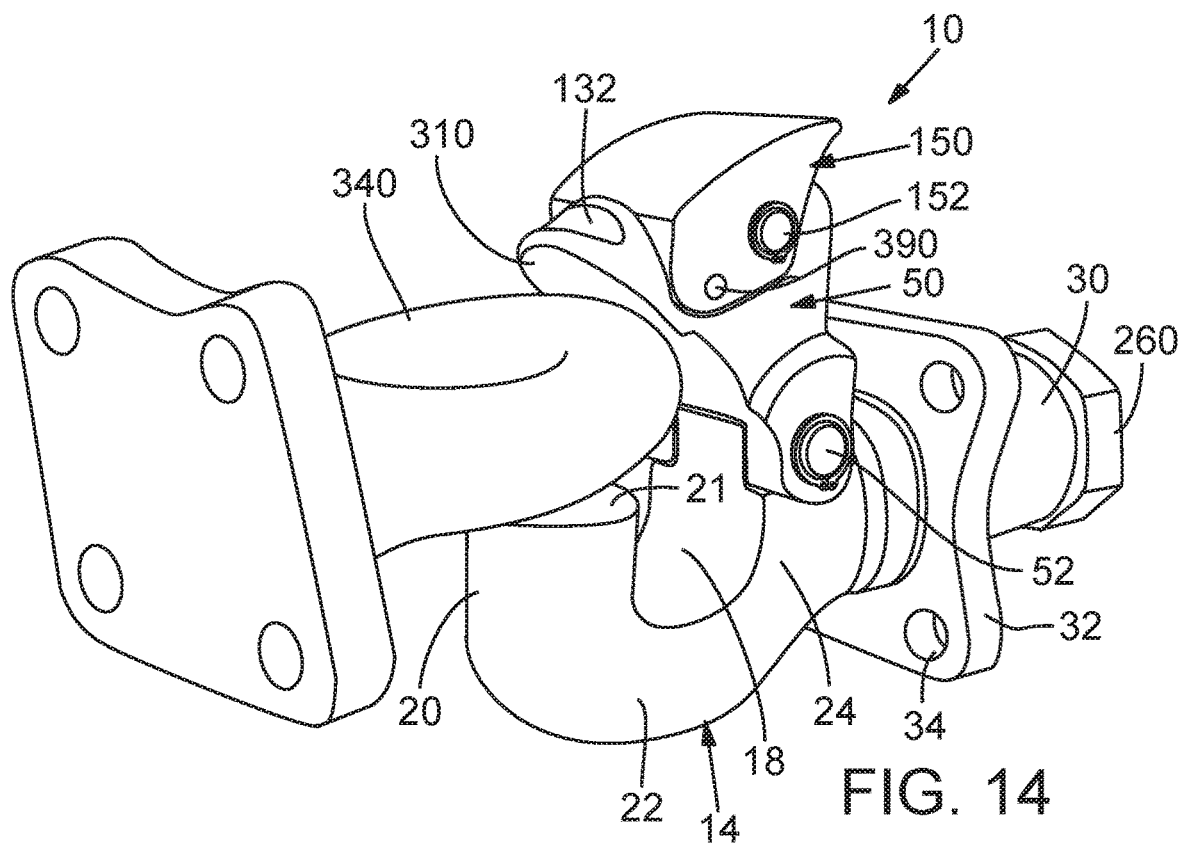
FIG. 14 is a perspective view showing the towing coupler of FIG. 1 in an open position and receiving a drawbar eye and also showing the guiding of the drawbar eye onto a hook portion of the towing coupler by a lower surface of a lower latch of the towing coupler.

FIG. 14 illustrates a drawbar eye 340 being positioned on the hook 14 of the coupler 10. As the drawbar eye 340 is moved toward the coupler, the surface 310 of the lower latch 50 is engaged by the drawbar eye and directs the drawbar eye downwardly into the opening 18 of the hook portion 14.

Figure 15:
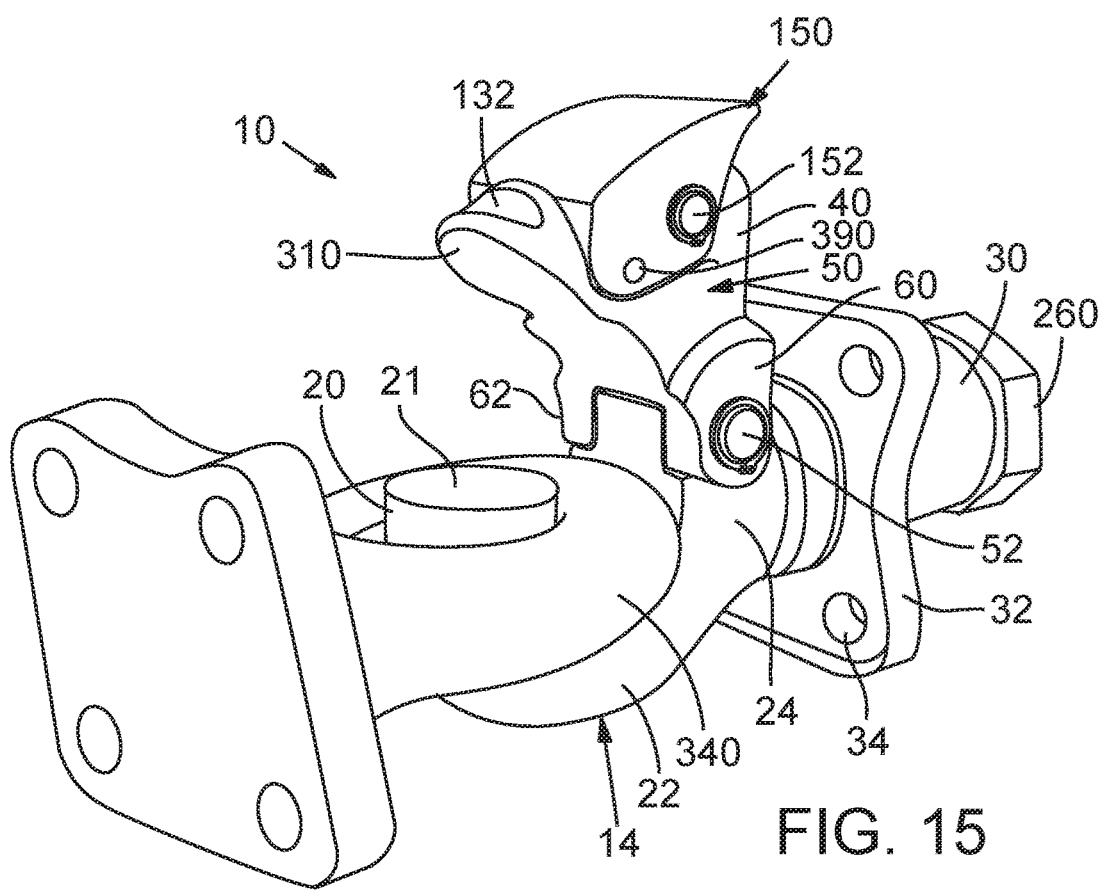
FIG. 15 shows the drawbar eye in a position received by the open towing coupler.

FIG. 15 illustrates the drawbar eye 340 on the hook portion 14 with surface 21 of the leg section 20 of the hook portion 14 shown positioned above the illustrated drawbar eye.

Figure 16:
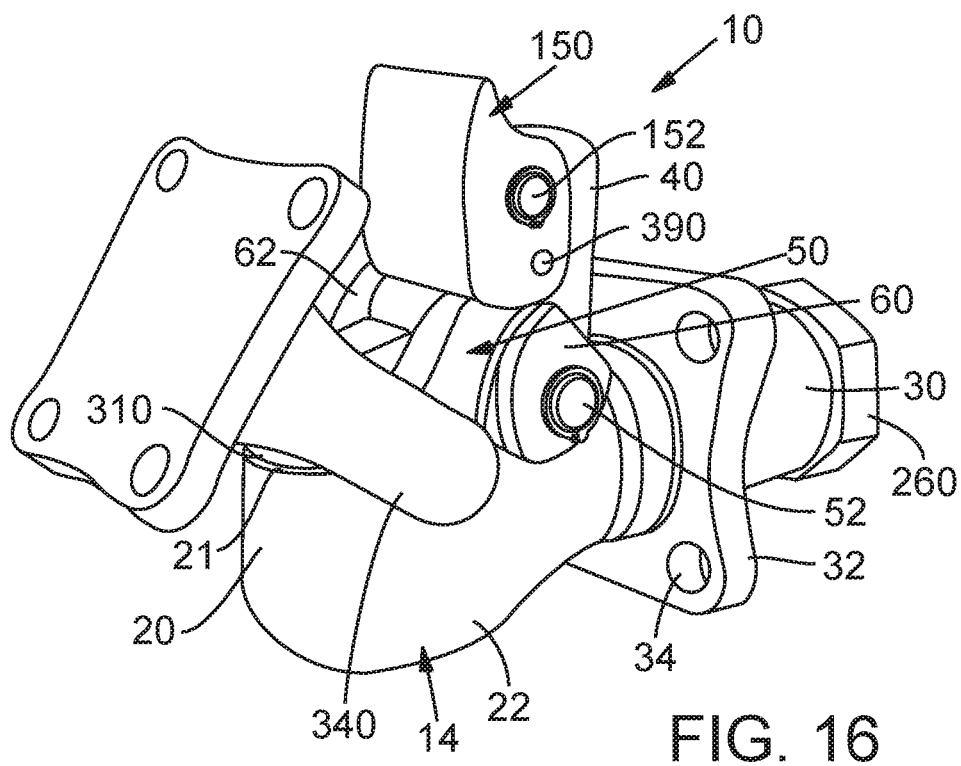
FIG. 16 shows the drawbar eye in an upper position as allowed by the towing coupler.
Figure 17:
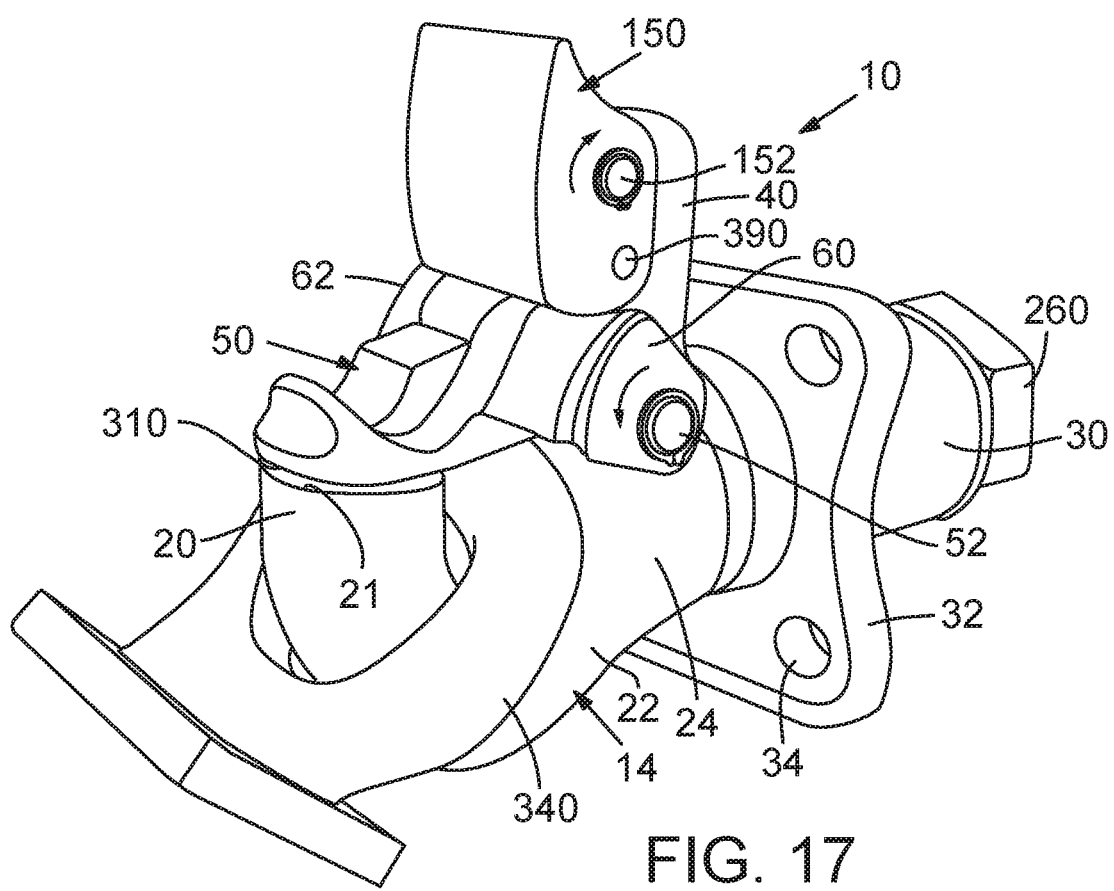
FIG. 17 shows the drawbar eye in a lower position as allowed by the towing coupler.

FIG. 16 illustrates the coupler 10 in a closed position and with the drawbar eye 340 pivoted upwardly as permitted by the illustrated construction. As previously pointed out, the construction allows pivoting of the drawbar eye upwardly through an angle of, for example, 35 degrees from a horizontal plane when the coupler 10 is vertical. FIG. 17 illustrates the drawbar eye 340 pivoted in a downward direction when the latch 10 is in a closed position. The illustrated coupler allows downward pivoting of the drawbar eye, for example 40 degrees from a horizontal plane when the coupler 10 is in the vertical orientation. These upward and downward pivot angles can be varied but do facilitate relative movement between the truck and towed trailer, for example, as the truck hits a bump or crests a hill.

Having illustrated and described the principles of my invention with reference to an exemplary embodiment. The disclosure is not limited to this embodiment and includes all novel and non-obvious combinations and sub-combinations of elements disclosed herein and related methods. It should be apparent to those of ordinary skill in the art that the disclosed coupler can be modified in arrangement and detail without departing from the inventive principles disclosed herein. I claim all such variations which fall within the scope of the claims.

The invention claimed is:

1. A towing coupler for a vehicle comprising:
a body comprising a hook portion having an upwardly facing hook opening and a latch supporting portion projecting upwardly from the hook portion;
a first latch pivoted to the latch supporting portion and pivotal about a first latch pivot axis between first latch open and first latch closed positions, the first latch comprising upwardly facing first and second latch engaging surfaces, the first latch engaging surface being spaced further from the first latch pivot axis than the second latch engaging surface, wherein the first latch engaging surface comprises first and second first latching surface portions with a land positioned at least partially between the first and second first latching surface portions, the land being sized and positioned to engage the latch supporting portion when the first latch is in the first latch open position;
a first spring coupled to the body and to the first latch and biasing the first latch to pivot about the first latch pivot axis in a first direction and away from the first latch closed position;
a second latch pivoted to the latch supporting portion and pivotal about a second latch pivot axis, the second latch being pivotal about the second latch pivot axis between a second latch first position and a second latch second position, wherein in the second latch first position and with the first latch in the first latch open position, the second latch is coupled at least partially to the first latch engaging surface, and wherein in the second latch second position and with the first latch in the first latch closed position, the second latch is coupled at least partially to the second latch engaging surface; and
a second spring coupled to the body and to the second latch and biasing the second latch to pivot about the second latch pivot axis in a second direction opposite to the first direction, the second spring pivoting the second latch to the second latch second position upon pivoting of the first latch from the first latch open position toward the first latch closed position.

2. A towing coupler for a vehicle according to claim 1 wherein the first latch engaging surface comprises a concave first latch engaging surface portion facing away from the hook portion, wherein the second latch engaging surface comprises a concave second latch engaging surface portion facing away from the hook portion.

3. A towing coupler for a vehicle according to claim 2 wherein the radius of curvature of the concave second latch engaging surface portion is smaller than the radius of curvature of the concave first latch engaging surface portion.

4. A towing coupler according to claim 2 wherein the second latch comprises downwardly facing third and fourth latch engaging surfaces, wherein the third and fourth latch engaging surfaces are positioned to at least partially engage the first latch engaging surface when the first latch is in the first latch open position and the second latch is in the second latch first position, and wherein the fourth latch engaging surface is positioned to at least partially engage the second latch engaging surface when the first latch is in the first latch closed position and the second latch is in the second latch second position.

5. A towing coupler according to claim 1 wherein the second latch engaging surface comprises first and second spaced apart second latching surface portions and wherein a portion of the latch supporting portion is positioned between the first and second spaced apart latching surface portions.

6. A towing coupler according to claim 1 wherein each of the first and second first latching surface portions comprise concave surfaces and each of the first and second spaced apart second latching surface portions comprise concave surfaces.

7. A towing coupler according to claim 6 wherein the radius of curvature of each of the first and second spaced apart second latching surface portions is smaller than the radius of curvature of each of the first and second first latching surface portions.

8. A towing coupler according to claim 1 wherein the second latch comprises third and fourth latch engaging portions, the third latch engaging portion comprising first and second spaced apart third latching surface portions and the fourth latch engaging portion comprising first and second spaced apart fourth latching surface portions, and wherein the land is positioned between the first and second spaced apart fourth latching surface portions at least when the first latch is in the first latch open position.

9. A towing coupler according to claim 8 wherein each of the first and second first latching surface portions and first and second spaced apart second latching surface portions are concave, and wherein the first and second spaced apart third latching surface portions and the first and second spaced apart fourth latching surface portions are convex.

10. A towing coupler according to claim 9 wherein the radius of curvature of each of the first and second spaced apart second latching surface portions is smaller than the radius of curvature of each of the first and second first latching surface portions.

11. A towing coupler according to claim 1 wherein the second latch pivot axis is parallel to the first latch pivot axis, and wherein the second latch pivot axis is positioned higher on the latch supporting portion than the first latch pivot axis.

12. A towing coupler for a vehicle comprising:
a body comprising a hook having a first leg portion, a base portion and a second leg portion spaced from the first leg portion so as to define a tow draw bar receiving space above the base portion and between the first and second leg portions, the hook having an upwardly facing hook opening communicating with the tow draw bar receiving space, the body also comprising a latch supporting column portion projecting upwardly from the second leg portion;
a first latch comprising a first latch proximal end portion and a first latch distal end portion, the first latch proximal end portion being pivoted to the column portion and pivotal about a first latch pivot axis, the first latch being pivotal between a first latch closed position and a first latch open position, wherein in the first latch closed position the first latch overlies the hook opening and the first latch distal end portion engages the first leg portion of the hook and closes the hook opening, and wherein in the first latch open position the first latch distal end portion is pivoted away from the first leg portion of the hook to open the hook opening to provide access to the tow draw bar receiving space;
the first latch comprising upwardly facing first and second latch engaging surfaces, the first latch engaging surface being spaced nearer to the first latch distal end portion than the second latch engaging surface, and wherein a ridge is provided between the first and second latch engaging surfaces with the first and second latch engaging surfaces having respective surface portions that slope downwardly from the ridge;
a first spring coupled to the body and to the proximal end portion of the first latch and biasing the first latch to pivot about the first latch pivot axis in a first direction and away from the first latch closed position and toward the first latch open position;
a second latch pivoted to the column portion and pivotal about a second latch pivot axis, the second latch being pivotal about the second latch pivot axis between a second latch first position and a second latch second position;
the second latch comprising third and fourth latch engaging surfaces, wherein with the second latch in the second latch first position and the with the first latch in the first latch open position, both of the third and fourth latching surfaces are positioned to at least partially abut the first latch engaging surface, and wherein in the second latch second position and with the first latch in the first latch closed position, the third latch engaging surface is positioned to at least partially abut the second latch engaging surface; and
a second spring coupled to the body and to the second latch and biasing the second latch to pivot about the second latch pivot axis in a second direction opposite to the first direction, the second spring and pivoting the second latch to the second latch second position upon pivoting of the first latch from the first latch open position in a direction toward the first latch closed position.

13. A towing coupler for a vehicle according to claim 12 wherein at least a portion of the first latch engaging surface comprises a concave first latch engaging surface facing away from the hook, the concave first latch engaging surface comprising first and second diverging upwardly sloped surface portions, the first upwardly sloped surface portion being positioned nearer to the distal end of the first latch than the second upwardly sloped surface portion;
wherein at least a portion of each of the third and fourth latch engaging surfaces comprise a convex latch engaging surface;
wherein the third latch engaging surface is positioned to at least partially abut the first upwardly sloped portion and the fourth latch engaging surface is positioned to at least partially abut the second upwardly sloped surface portion when the first latch is in the first latch open position and the second latch is in the second latch first position, and wherein the fourth latch engaging surface is positioned to engage the second latch engaging surface when the first latch is in the first latch closed position and the second latch is in the second latch second position.

14. A towing coupler according to claim 12 wherein the first latch engaging surface comprises first and second first latching surface portions with a land positioned at least partially between the first and second first latching surface portions, the land being sized and positioned to engage the column portion when the first latch is in the first latch open position; wherein the second latch engaging surface comprises first and second spaced apart second latching surface portions and wherein a portion of the column portion is positioned between the first and second spaced apart second latching surface portions.

15. A towing coupler according to claim 14 wherein each of the first and second first latching surface portions and first and second spaced apart second latching surface portions comprise concave surfaces.

16. A towing coupler according to claim 15 wherein the radius of curvature of the concave surfaces comprising the first and second spaced apart second latching surface portions is smaller than the radius of curvature of the concave surfaces comprising the first and second first latching surface portions.

17. A towing coupler according to claim 14 wherein the third latch engaging surface comprises first and second spaced apart third latching surfaces and the fourth latch engaging surface comprises first and second spaced apart fourth latching surfaces, and wherein the land is positioned at least partially between the first and second spaced apart fourth latching surfaces at least when the first latch is in the first latch open position.

18. A towing coupler according to claim 12 wherein the second latch pivot axis is parallel to the first latch pivot axis, and wherein the second latch pivot axis being positioned higher on the column portion than the first latch pivot axis.

* * * * *

UNITED STATES PATENT AND TRADEMARK OFFICE
CERTIFICATE OF CORRECTION

PATENT NO. : 11,186,129 B1
APPLICATION NO. : 16/398849
DATED : November 30, 2021
INVENTOR(S) : McCurter Page 1 of 1

It is certified that error appears in the above-identified patent and that said Letters Patent is hereby corrected as shown below:

In the Claims

Column 14, Line 27, "and the with the" should read --and with the--.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*